(12) United States Patent
Neogy et al.

(10) Patent No.: US 11,847,480 B2
(45) Date of Patent: *Dec. 19, 2023

(54) SYSTEM FOR DETECTING IMPAIRMENT ISSUES OF DISTRIBUTED HOSTS

(71) Applicant: Amazon Technologies, Inc., Seattle, WA (US)

(72) Inventors: Amit Neogy, Bellevue, WA (US); Dennis Arthur Hills, Lake Forest Park, WA (US); Siavash Irani, Tukwila, WA (US); Sota Baba, Issaquah, WA (US); Cory Forsythe, Frisco, TX (US); Bryan Mareletto, Seattle, WA (US); Kenji Takehara, Tokyo (JP)

(73) Assignee: Amazon Technologies, Inc., Seattle, WA (US)

( * ) Notice: Subject to any disclaimer, the term of this patent is extended or adjusted under 35 U.S.C. 154(b) by 275 days.

This patent is subject to a terminal disclaimer.

(21) Appl. No.: 16/292,070

(22) Filed: Mar. 4, 2019

(65) Prior Publication Data

US 2019/0196861 A1  Jun. 27, 2019

Related U.S. Application Data

(63) Continuation of application No. 15/188,913, filed on Jun. 21, 2016, now Pat. No. 10,223,145.

(51) Int. Cl.
*G06F 9/455* (2018.01)
*G06Q 10/06* (2023.01)
(Continued)

(52) U.S. Cl.
CPC ........ *G06F 9/45558* (2013.01); *G06F 3/0484* (2013.01); *G06F 9/451* (2018.02);
(Continued)

(58) Field of Classification Search
None
See application file for complete search history.

(56) References Cited

U.S. PATENT DOCUMENTS

| | | | |
|---|---|---|---|
| 7,263,632 B2 * | 8/2007 | Ritz | G06F 11/0709 714/25 |
| 8,103,906 B1 * | 1/2012 | Alibakhsh | H04L 67/01 718/1 |

(Continued)

OTHER PUBLICATIONS

Wikipedia, "Mutual Information," Jun. 3, 2016, retrieved Jun. 21, 2016, from https://en.wikipedia.org/wiki/Mutual_information, 12 pages.

*Primary Examiner* — Bing Zhao
(74) *Attorney, Agent, or Firm* — Davis Wright Tremaine LLP

(57) ABSTRACT

A notification of an event associated with a computing instance provided to customers of a computing resource service provider is obtained. Log information associated with the computing instance is obtained from a log of operations of the computing instance, with the log information indicating events associated with the computing instance. Pattern matching on the log information is performed to produce a pattern matching result. The computing instance is determined to be impaired based at least in part on the pattern matching result including indications of impairment. A mitigation operation is performed to the computing instance to mitigate the impairment.

22 Claims, 8 Drawing Sheets

(51) Int. Cl.
  *G06F 11/07*     (2006.01)
  *G06F 11/30*     (2006.01)
  *G06F 9/451*     (2018.01)
  *G06F 11/14*     (2006.01)
  *H04L 67/54*     (2022.01)
  *G06F 3/0484*    (2022.01)
  *H04L 41/22*     (2022.01)

(52) U.S. Cl.
  CPC ...... *G06F 11/0712* (2013.01); *G06F 11/1471* (2013.01); *G06F 11/301* (2013.01); *G06Q 10/06* (2013.01); *H04L 41/22* (2013.01); *H04L 67/54* (2022.05); *G06F 2009/45591* (2013.01); *G06F 2009/45595* (2013.01)

(56) References Cited

U.S. PATENT DOCUMENTS

| | | | | |
|---|---|---|---|---|
| 8,661,295 | B1* | 2/2014 | Khanna | H04L 69/40 |
| | | | | 714/43 |
| 8,738,972 | B1* | 5/2014 | Bakman | G06F 11/3433 |
| | | | | 714/47.2 |
| 8,862,728 | B2* | 10/2014 | Jayachandran | G06F 11/0754 |
| | | | | 709/224 |
| 9,729,401 | B2 | 8/2017 | Gupta | |
| 2014/0344622 | A1* | 11/2014 | Huang | G06F 11/0775 |
| | | | | 714/37 |
| 2016/0085578 | A1 | 3/2016 | Bhide | |

\* cited by examiner

SYSTEM FOR DETECTING IMPAIRMENT ISSUES OF DISTRIBUTED HOSTS

CROSS-REFERENCE TO RELATED APPLICATION

This application is a continuation of U.S. patent application Ser. No. 15/188,913, filed on Jun. 21, 2016, entitled "SYSTEM FOR IMPAIRMENT ISSUES OF DISTRIBUTED HOSTS," the disclosure of which is hereby incorporated herein by reference in its entirety.

BACKGROUND

The use of remote computing services, such as remote program execution and remote data storage, has greatly increased in recent years. Customers may reduce expenses and overhead by purchasing these services from a computing resource service provider. Customers of the computing resource service provider can communicate with computing systems, services, and virtual machine instances which are widely distributed over many geographically dispersed networks. Customers, for instance, may communicate with computers of other customers to access and/or provide data while using services of a computing resource service provider.

In many instances, customers configure and operate remote networks and remote computer systems using hardware managed by computing resource service providers, thereby reducing infrastructure costs, and achieving other advantages. Networks often span multiple geographic boundaries connecting with other networks and connection errors may occur at various points along a communication path. The computer systems often utilize computing resources of various services offered by the computing resource service provider as well as computing resources operated by the customer. These computer systems may occasionally experience errors and other difficulties that can be resolved using support services or troubleshooting services. With such configurations of networks and computing resources, ensuring connectivity and operability between computing resources can be challenging, especially as the size and complexity of such networks and computer systems grow.

BRIEF DESCRIPTION OF THE DRAWINGS

Various techniques will be described with reference to the drawings, in which.

DETAILED DESCRIPTION

Figure 1:
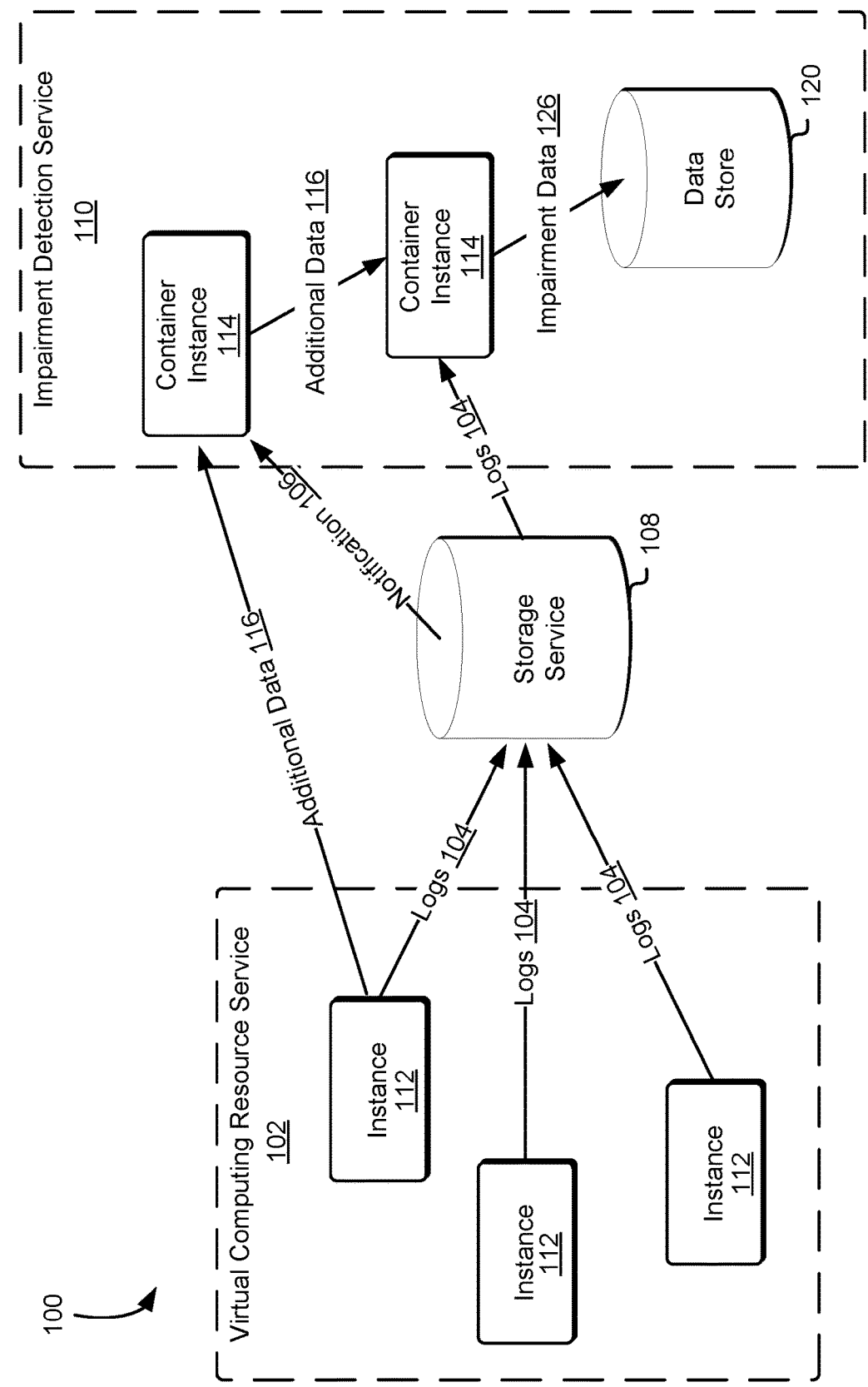
FIG. 1 is an environment illustrating an impairment detection service in accordance with an embodiment.

In various examples described below, a computing resource service provider provides customers with access to various computing resources to execute and/or operate various applications on behalf of the customer. For example, customers may be provided with access to a virtual computer system service, the virtual computer system service may provide customers with access on-demand computing resources such as virtual machines or similar host computer systems. These host computer systems operated by the customer may occasionally experience errors or crashes. Although the host computer systems made accessible to the customers by the virtual computer system service and/or computing resource service provider are generally reliable, occasional errors may occur which can be detected and fixed. The computing resources provided to the customers may be varied and may be capable of executing a variety of different applications. As a result, it may be important to detect impairment patterns across multiple axis or factors, such as hardware types, virtual machine types, network types, application types, server types, and any other attributes of the instances provided to customers.

As described in greater detail below, the customers may operate a virtual computer system instance supported by a hypervisor or similar virtualization layer on physical computing resources provided by the computing resource service provider. The virtualization layer, in addition to providing the virtual computer system instance with access to the physical computing resources, may monitor the execution of the virtual computer system instance and generate log information including information corresponding to the operation of the virtual computer system instance. For example, the virtual computer system instance may execute an application or other software (e.g., drivers, libraries, operations system, or other executable code) that causes the virtual computer system instance to fail to operate. The virtualization layer monitoring the execution of the virtual computer system instance may detect failures of the virtual computer system instance and generate a log entry including information associated with the failures. An impairment detection service may collect log information from the virtualization layers operated by the computing resource service provider and detect impairment patterns. The log information may be collected at various intervals, when a crash, failure, or other error is detected, or continuously during the operation of the virtualization layer.

The impairment detection service may aggregate these logs and perform pattern matching to detect failures and other errors that may have occurred during the operation of the virtual computer system instances. Once a failure or other error is detected the impairment detection service may collect additional information associated with the virtual computer system instances to determine one or more relevant factors associated with the failure or other error. The one or more relevant factors may be visualized or otherwise displayed in a user interface to determine a cause of the failure or other error. In addition, the logs, additional information, and/or one or more relevant factors may be provided to a machine learning engine to analyze the data and determine a cause of the failure or other error.

In various embodiments, the logs, additional data obtained from the virtual computer system instance, and/or the relevant factors may be provided to a stream service and published as an event stream. Furthermore, the impairment detection service may store the logs, additional data obtained from the virtual computer system instance, and/or the relevant factors in a data store, or other data storage service described in greater detail below. The impairment detection service may also monitor the published event information for an interval of time and determine impairment patterns and various cause of virtual computer system instance impairment. Various techniques such as machine learning, operational experience (e.g., human generated rules), statistical methods, or some combination of techniques may be used to determine and/or detect virtual computer system instance impairment and causes thereof.

In the preceding and following description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

FIG. 1 illustrates an environment 100 in which an impairment detection service 110 may generate impairment data 126 based at least in part on logs 104 and additional data 116. As illustrated in FIG. 1, the logs 104 may be obtained from a virtual computing resource service 102. The virtual computing resource service 102 may provide virtual computer system instances 112 (referred to as instances in FIG. 1 for simplicity) to customers. The customers may use the virtual computer system instances 112 to execute various applications. As described in greater detail below, the virtual computer system instances 112 may be supported by a virtualization layer (e.g., a hypervisor) executed by physical computing resources such as a server computer system. The virtual computer resource service 102 may include a plurality of server computer systems, each hosting a number of virtual computer system instances 112. Customers may interact with the virtual computer resource service 102 (via appropriately configured and authenticated API calls) to provision and operate virtual computer system instances 112 that are instantiated on physical computing devices hosted and operated by a computing resource service provider.

The virtual computer system instances 112 may be used for various purposes, such as to operate as servers supporting a website, to operate business applications or, generally, to serve as computing power for the customer. Other applications for the virtual computer systems may be to support database applications, electronic commerce applications, business applications, and/or other applications. Although the virtual computer resource service 102 is shown in FIG. 1, any other computer system or computer system service may be utilized in the computing resource service provider, such as a computer system or computer system service that does not employ virtualization or instantiation and instead provisions computing resources on dedicated or shared computers/servers and/or other physical devices.

The virtualization layer supporting the execution of the instance may monitor the virtual computer system instances 112 and generate logs 104. For example, the virtualization layer may have a software package or other executable code that records the operation of the virtual computer system instances 112 in the logs 104. In yet other embodiments, the virtual computer system instances 112 generate the logs 104.

The logs 104 may include a variety of information corresponding to all or a portion of the operations of the virtual computer system instances 112. For example, during a failure or error affecting the virtual computer system instances 112, a record in the logs 104 may be created indicating that the virtual computer system instances 112 failed or was not shutdown properly. In various embodiments the logs 104 may include other data structures that record operations and/or events of the virtual computer system instances 112.

The logs 104 may be periodically or aperiodically stored in a data storage service 108. The data storage service 108 may include physical computing resources such as data storage servers that allow synchronous processing of requests to store and/or access data stored on the data storage servers. The data storage service 108 may operate using computing resources (e.g., databases, servers, virtual machines) that enable the data storage service 108 to locate and retrieve data quickly, so as to allow data to be provided in responses to requests for the data. For example, the data storage service 108 may maintain stored data in a manner such that, when a request for a data object is retrieved, the data object can be provided (or streaming of the data object can be initiated) in a response to the request. As noted, data stored in the data storage service 108 may be organized into data objects. The data objects may have arbitrary sizes except, perhaps, for certain constraints on size. Thus, the data storage service 108 may store numerous data objects of varying sizes. The data storage service 108 may operate as a key value store that associates data objects with identifiers of the data objects which may be used to retrieve or perform other operations in connection with the data objects stored by the data storage service 108.

For example, the virtualization layer may transmit the logs 104 in a request to store data to the data storage service 108, the request may include a data object identifier associated with the logs 104. The data storage service 108 may respond to the request by storing the logs 104 and transmit a notification 106, including the data object identifier, to an impairment detection service 110. The notification 106 may be generated by a notification service (not illustrated in FIG. 1 for simplicity). The notification service may be a stand-alone service or may be integrated or a part of the data storage service 108. Customers, including other services such as the impairment detection service, of the notification service may configure topics for which customers seek to receive notifications, subscribe to the topics, publish messages, or configure delivery of the messages over a particular protocol (e.g., hypertext transfer protocol (HTTP), e-mail and short message service (SMS), among others). Topics may include a variety of events that may trigger or otherwise cause a notification to be transmitted. For example as illustrated in FIG. 1, a topic may include the storage of logs 104 by the data storage service 108. The notification service may provide notifications to subscribers (e.g., end points such as people or application subscribed to particular topics) using a "push" mechanism without the need to check periodically or "poll" for new information and updates.

The notification 106 may trigger the execution of a container instance 114, described in greater detail below in connection with FIG. 4. The container instances 114 may be part of the impairment detection service 110. The impairment detection service 110 may include a variety of computing resources, such as container instances, data stores, databases, virtual machines, server computer systems that detect impairment patterns, determine relevant factors for virtual computer system instance impairment, and one or more causes of the virtual computer system instance impairment. The impairment detection service 110 may determine relevant factors of virtual computer system instance impairment by at least correlating information in the detected impairment patterns to determine mutual information. Returning to the example illustrated in FIG. 1, the notification 106 may trigger the execution of the container instance 114. The container instance 114 may obtain additional data 116 from the virtual computer system instances 112. The additional data may include information associated with the virtual computer system instances 112 such as software executed by the virtual computer system instances 112, a patch level, version information, customers associated with the virtual computer system instances 112, or other any information that may be suitable for correlating impairments across the virtual computer system instances 112. The additional data 116 may be combined with the logs 104 and processed by the container instances 114 to generate impairment data 126.

In various embodiments, once the notification 106 is received the container instances 114 process the logs to detect impairment of the virtual computer system instances 112. The container instances 114 may use pattern matching or regular expressions to process the logs 104 to detect virtual computer system instances 112 that have been impaired (e.g., crashed). A regular expression (sometimes called a rational expression) generally refers to, for example, a sequence of characters that define a search pattern, such as for use in pattern matching with strings or string matching. For example, the container instances 114 may search or otherwise parse the logs 104 for error codes, such as the log record described above indicating that the virtual computer system instance 112 was not shutdown properly. The regular expressions used by the container instances 114 to detect impairment may include specific standard textual syntax (distinct from the mathematical notation) for representing patterns that matching text needs to conform to. Each character in a regular expression (that is, each character in the string describing the pattern the regular expression is configured to match) may include a meta-character (e.g., a character with special meaning) or a regular character (e.g., a character with literal meaning). The meta-characters and regular characters may be used to identify textual material or other information in the logs 104 of a given pattern, or process a number of instances the given pattern. Pattern-matches can vary from a precise equality to a very general similarity (controlled by the meta-characters). The meta-character syntax is designed specifically to represent prescribed targets in a concise and flexible way to direct the automation of text processing of a variety of input data, in a form easy to type using standard ASCII keyboard. For example, meta-characters may include wildcards or other characters to enable more robust pattern matching. The regular expressions may be generated to detect error codes or other indications of impairment of the virtual computer system instances 112.

Returning to FIG. 1, once the logs 104 have been processed to detect impaired or previously impaired (e.g., the virtual computer system instance 112 may have crashed but has since been rebooted) virtual computer system instances 112, the container instances 114 may obtain additional data 116 as described above. The process of obtaining the additional data 116 may be triggered once impairment is detected in the logs 104 or after processing of all or a portion of the logs 104 indicated in the notification 106. For example, the notification 106 may indicate all of the logs 104 generated and stored for the last 24 hours, the container instance 114 may obtain the additional data 116 once all of the logs 104 for the last 24 hours have been processed and the impaired virtual computer system instances 112 have been detected. The additional data 116 may include information corresponding to the virtualization layer, physical host, data center, and/or region associated with the virtual computer system instances 112.

The additional data 116 and the logs 104 may be combined into a single data set referred to in FIG. 1 as impairment data 126. The impairment data 126 may include the logs 104 and the additional data 116 with or without processing. For example, the container instance 114 may perform processing of the additional data 116 and the logs 104 to determine a set of relevant factors for all or a portion of the impairments detected in the logs 104. This processing of the additional data 116 and the logs 104 may include pattern matching, machine learning, statistical methods, or other algorithms correlating the data to determine relevant factors in the impairment of the virtual computer system instances 112. For example, the additional data 116 may indicate a particular patch version for an application executed by the instances 112 this information may be correlated with the logs 104 to determine that the particular patch version for the application is a relevant factor in a page fault or other impairment of the instance 112. The process of pattern matching may include checking a given sequence of tokens (e.g., information from the additional data 116 and/or the logs 104) for the presence of the constituents of some pattern. The patterns may have the form of either sequences or tree structures. The result of pattern matching may include the locations (if any) of a pattern within the token sequence (e.g., some portion of the additional data 116 or the logs 104) or outputting some component of the matched pattern (e.g., relevant factors).

The impairment data 126 (either processed or unprocessed) may be stored in a data store 120. The data store 120 may include a database, such as a Structured Query Language (SQL) database, which enables customers, the impairment detection service 110, or other services of the computing resource service provider to query the data store 120 for information contained in the impairment data 126 and stored by data store 120. For example, a machine learning engine, described in greater detail below, may search the data store 120 for relevant factors of a particular impairment or other information to determine a cause of a particular impairment. In yet other embodiments, the data store 120 may be non-queryable, in so much as the data store 120 may store information (e.g., logs 104, additional data 116, impairment data 126, or any other data described herein) as data objects which are obtainable by a data object identifier, such as a file name or key, but does not enable queries on information contained in the data store 120.

Unless otherwise stated or clear from context, the term "service" may be understood to be a computer system program, process, client, server, service, application, module, operating system entity, controlling domain, communication node, or collection of these and/or other such computer system entities. A "service" may be a client and/or a server and in some embodiments may be configured to send and/or receive communications, data, requests, and/or other such requests from other services within the computer system.

Figure 2:
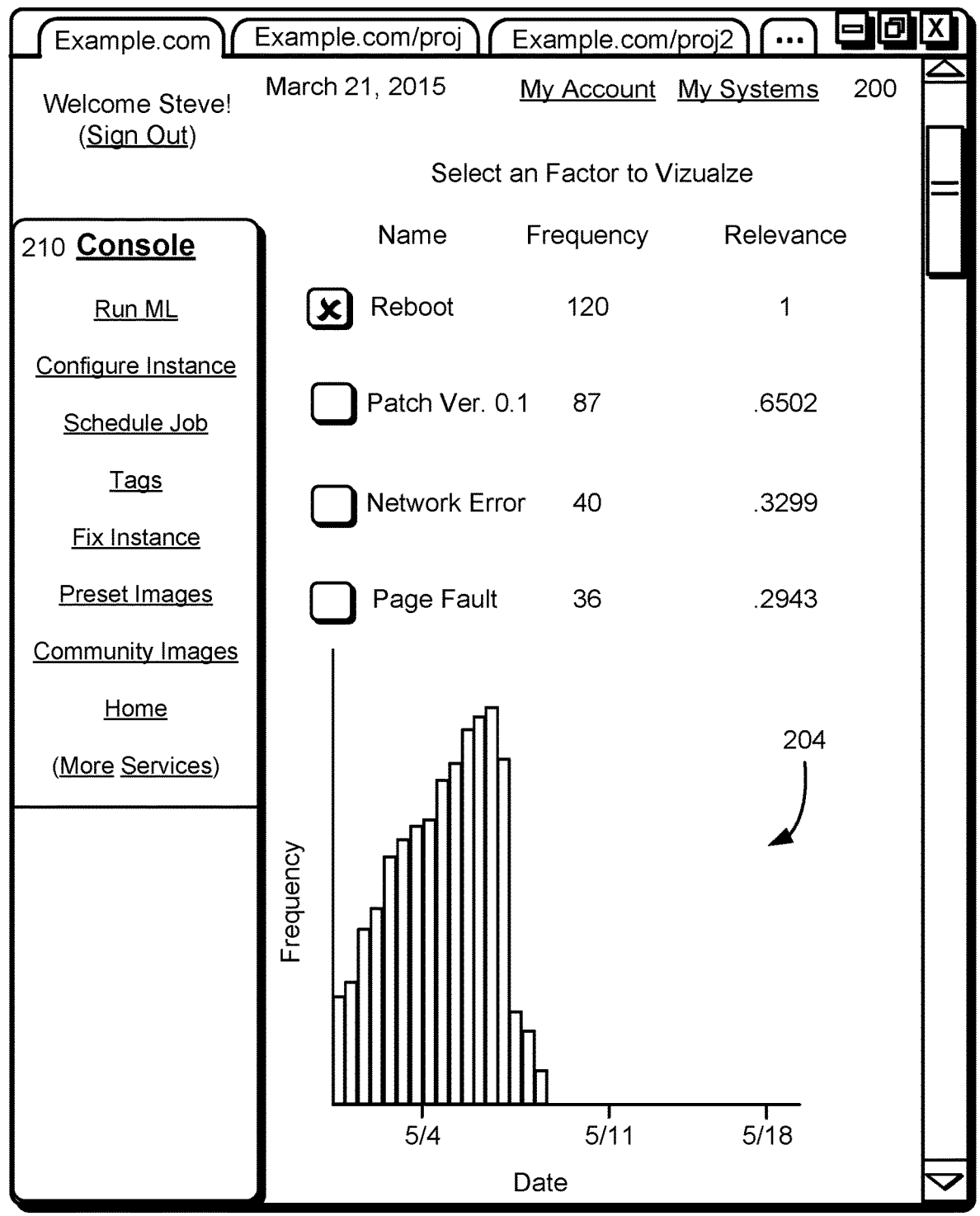
FIG. 2 is a diagram illustrating a webpage for displaying impairment data collected by an impairment detection service in accordance with an embodiment.

FIG. 2 shows a webpage 200 which may be displayed by an application executed by a computing system enabling a technician to interact with an impairment detection service operated by the computing resource service provider. As illustrated in FIG. 2, the webpage 200 includes various graphical user interface elements that enable technicians to select, modify, and or view one or more relevant factors associated with virtual computer system instance impairment through a management console of which the webpage 200 is a part. In various embodiments, the technician interacts with the impairment detection service by issuing commands through the management console. The webpage 200 may be displayed by various applications, such as a mobile application or web browser. In this example, the webpage 200 includes various navigational features. For instance, on the left-hand side of the webpage 200, various links 210 may link to one or more other webpages that contain additional content corresponding to a variety of different actions the technician may cause to be performed.

The console pages may correspond to operations that may be performed by the impairment detection service and/or technician to determine or otherwise detect a cause of impairment (e.g., a crash or forced re-boot) of a virtual computer system instance. In this example, the links appear as textual words which enable the links to be selected using an appropriate input device such as a keyboard, mouse, touchscreen or other input device. Selection of one of the various links 210 may cause an application displaying the webpage 200 to submit, pursuant to a Uniform Resource Locator (URL) associated with the selected link by the programming of the webpage 200, a Hypertext Transfer Protocol (HTTP) request for the content associated with the link to a server that provided the webpage 200 or another server.

In this example, the webpage 200 also includes a graphical element configured as a graph 204 to visualize information associated with the relevant factors displayed on the webpage 200. The graph 204 may be a user interface element of the webpage 200 where the underlying code of the webpage 200 is configured to display information based at least in part on impairment data stored in a data store as described above in connection with FIG. 1. For example, selecting one or more relevant factors displayed in webpage 200 may cause the underlying code of the webpage 200 to obtain information associated with the selected relevant factors and generate a graph based at least in part on the obtained information. In the example illustrated in FIG. 2, the graph 204 shows the frequency of reboots in the detected impairments over an interval (e.g., days). In another example, the graph 204 may be generated by the impairment service and simply provided to the webpage 200 for display. In various embodiments, the graphs 204 may include various other user interface elements configured to display information to the technician such as a chart, table, spreadsheet, list, or other user interface element suitable for display information to a human user.

Furthermore, through the management console, the technicians may be guided through the process of determining a cause for a particular impairment and/or determining which factor of the one or more factors is the cause for the particular impairment. For example, the technician may be prompted to select one or more relevant factors for display in the graph 204. In addition, the customer may limit or select particular intervals of data corresponding to the relevant factors to be displayed. The process may be divided into steps and the technician may be prompted to provide information at each step. For example, the webpage 200 displays to the technician a list of different interval of time or different factors to review. The technician, using an input device, may select an interval of time or set of factors to view including graphs of the selected factors. The technician's selection may be stored until the entire process is completed or the technician's selection may be transmitted to the impairment detection service upon selection of a graphical user interface element.

As illustrated in FIG. 2, the webpage 200 may contain a graphical user interface element configured as icons displaying information associated with the computing resources (e.g., virtual computer system instances) operated by the customer that may contain and/or have associated with it one or more relevant factors determined by the impairment detection service. The icons may correspond to a particular computing resource utilized and/or available to the customer. The impairment detection service may periodically or aperiodically perform updates to the information displayed in the webpage 200. In addition, the technician, computing resource service provider, impairment detection service or other entity may determine a schedule for performing these updates. The schedule may include various event driven triggers. For example, when virtual computer system instance fails or generates an error, this event may be scheduled to trigger analysis of the impairment, processing of logs including operations of the virtual computer system instance, additional data associated with the computer system instance, or any of the other impairment detection and correlation analysis described herein.

Figure 3:
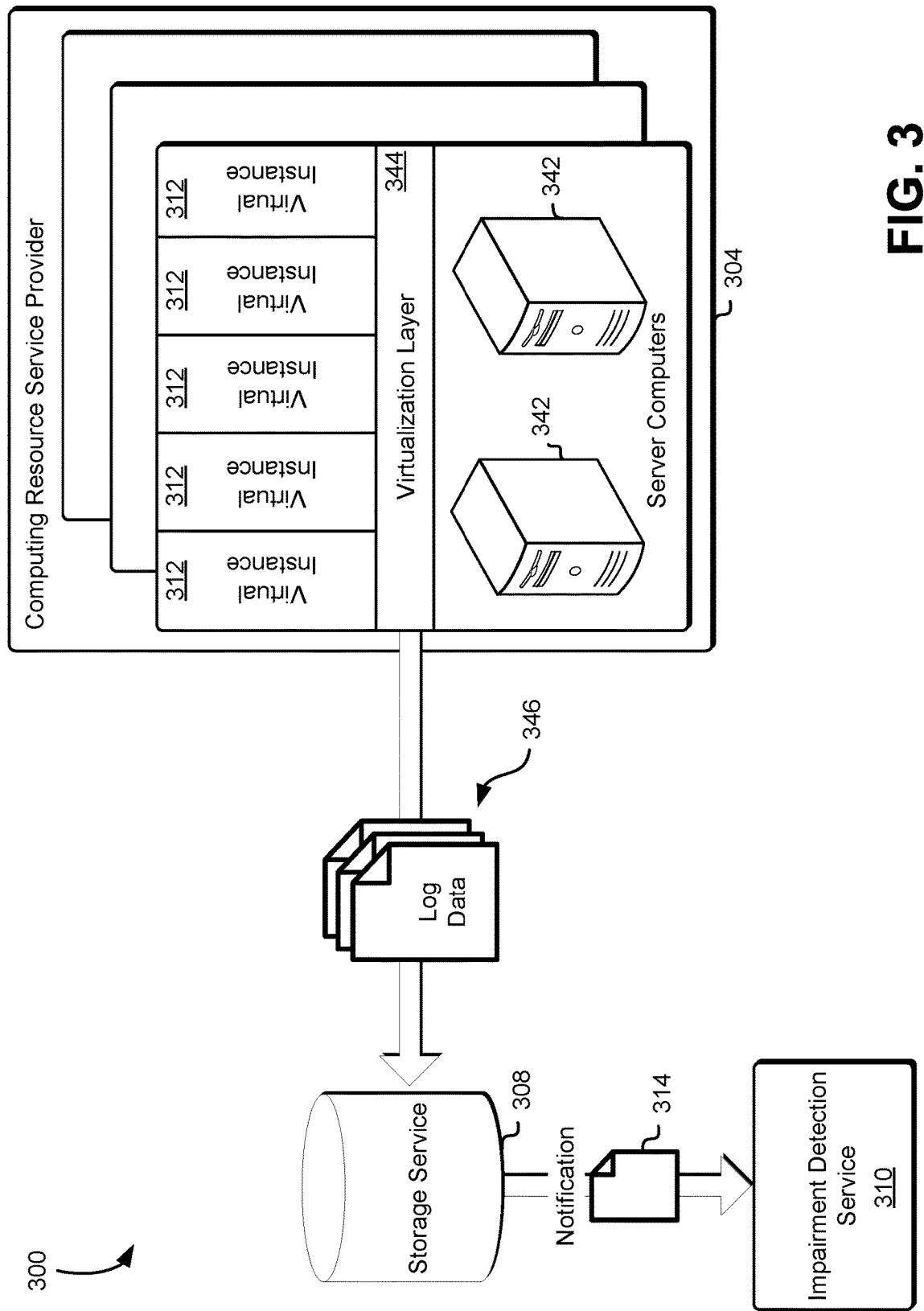
FIG. 3 is an environment illustrating the collection of log information by an impairment detection service in accordance with an embodiment.

FIG. 3 illustrates an environment 300 in which an impairment detection service 310 of a computing resource service provider 304 may obtain log data 346 in accordance with at least one embodiment. The impairment detection service 310, which may be implemented by physical hardware, is used by the computing resource service provider 304 to detect impairment patterns, one or more relevant factors for various impairments, and/or causes of the various impairment and to provide information to customers and/or other services of the computing resource service provider 304. The impairment detection service 310 may include a group of computing systems, such as the server computers 342 described in detail below, configured to generate impairment data based at least in part on log data 346 obtained from customers or other services of the computing resource service provider 304, such as a stream service described in greater detail below in connection with FIG. 5 or an data storage service 308.

The physical hardware may include a server computer 342. The server computer 342 may be any device or equipment configured to execute instructions for performing data computation, manipulation, or storage tasks, such as a computer or a server. A server computer 342 may be equipped with any needed processing capability including one or more processors, such as a central processing unit (CPU), a graphics processing unit (GPU) or a digital signal processor (DSP), memory, including static and dynamic memory, buses and input and output ports that are compliant with any handshaking, communications, or data transfer protocol. The physical hardware may also include storage devices, such as block-level storage devices, storage disks and tapes, networking equipment, and the like.

A virtualization layer 344 may include a bare metal hypervisor or a hosted hypervisor. The virtualization layer 344 executing on the server computer 342 enables the physical hardware to be used to provide computational resources upon which one or more virtual computer system instances 312 or other computing resources may operate. For example, the virtualization layer 344 enables a particular virtual computer system instance 312 to access physical hardware on the server computer 342 through virtual device drivers or other executable code on the virtual computer system instance 312. In another example, a block-level storage device can be virtualized and provided to the virtual computer system instance 312 through a virtual device driver. The virtualization layer 344 may include a hypervisor or virtualization software and/or hardware. The virtualization layer 344 may also include an instance of an operating system dedicated to administering the virtual computer system instance 312 or other computing resource executing on the server computer 342. In addition, the virtualization layer 344 may include software or other executable code that records the operation of the virtual computer system instances 312 and/or events of the virtual computer system instances 312. Each virtualization layer 344 may include its own networking software stack responsible for communication with other virtualization layers 344 and, at least in some embodiments, also responsible for implementing network connectivity between the virtual computer system instance 312 or other computing resources executing on the server computer 342 and virtual computer system instance 312 or computing resources executing on other server computers 342.

Furthermore, the server computer 342 may host multiple virtualization layers 344 of the same or different types on the same server computer 342 as well as virtual computer system instance 312 of the same or different types. For example, a server computer 342 may host a first virtual computer system instance 312 instantiated from a first volume image and operated by a first customer and may host a second virtual computer system instance 312 instantiated from a second volume image that is operated by a second customer. The virtualization layer 344 may be any device, software, or firmware used for providing a virtual computing platform and/or virtualized computing resources for the virtual computer system instance 312 and/or component thereof. The virtual computing platform may include various virtual computer components, such as one or more virtual CPUs, virtual memory, virtual disk storage, and the like. The virtual computer system instance 312 may be provided to the customers or other service of the computing resource service provider 304 and the customers may utilize the virtual computer system instance 312 or components thereof. Further, the computing resource service provider 304 may use one or more of its own virtual computer system instances 312 for supporting execution of its applications and providing computing resources for such applications.

Commands and other information may be included in an application program interface (API) call from the impairment detection service 310 or the data storage service 308 to or from the virtualization layer 344. The impairment detection service 310 enables the technicians, customers, and other services of the computing resource service provider 304 to detect and analyze log data 346 generated based at least in part on the operation virtual computer system instances 312 or other computing resources for impairment patterns or causes of various impairments. For example, the log data 346 may be stored in computing resources of the data storage service 308 by the virtualization layer, a notification 314 may be transmitted to the impairment detection service 310 indicating that new log data 346 has been made available by the data storage service 308 and is ready for analysis of impairments to the virtual computer system instances 312.

The request may be an API call including information corresponding to the customer, the data storage service 308, the log data 346, the impairment detection service 310, and/or the particular virtual computer system instance 312. In some embodiments, the impairment detection service 310 may determine a corresponding virtualization layer 344 for an impaired virtual computer system instance 312 and transmit a command to the virtualization layer 344 to obtain log data 346 corresponding to the virtual computer system instance 312 and store the log data 346 in the data storage service 308. In another example, the impairment detection service 310, detects impairment of a particular virtual computer system instance 312 and transmits a command to the virtualization layer to obtain additional data associated with the particular virtual computer system instance 312 as described above. Alternatively, the virtualization layer 344 may be configured to provide a copy of the log data 346 to a stream service or directly to the impairment detection service 310. The log data 346 may include operations execute by the virtual computer system instance 312.

The log data 346 may be stored in multiple locations for the purpose of durability. Furthermore, the log data 346 may include modification or changes to a log since a previous point in time the log data was stored or otherwise persisted. For example, the virtualization layer 344 or another component of the computing resource service provider 304 may generate log data 346 based at least in part on the portion of the log data 346 that has been modified since the last command to store the log data 346. This may reduce an amount of data that is stored by the data storage service 308 and may enable the impairment detection service 310 to determine a time-line or history of impairments to virtual computer system instance 312. For example, the impairment detection service 310 may use the time-line information to determine in what a logical volume (e.g., boot volume); a particular file, software, operating system, patch, Basic Input/Output System (BIOS), system hardware, device drivers, or other factor may be a cause of a particular impairment.

In yet other embodiments, a separate process (not shown in FIG. 3 for simplicity) is used to generate log data 346 corresponding to the virtual computer system instances 312 or other computing resources. In these embodiments, the separate process generates the log data 346 using computing resources of the server computer 342 or component thereof and stores log data 346 in one or more storage devices of the data storage service 308. The separate process may be a process or other executable code supported by the virtualization layer 344. The data storage service 308 may be a group of computer systems configured to store log data 346 that is accessible to one or more other computer systems, such as the impairment detection service 310. In this way, log data 346 maintained by the data storage service 308 may be accessed by the impairment detection service 310 and/or customers. The data storage service 308 may be a data store or a non-queryable data storage system. A data storage system and/or data storage device is queryable if the data storage system and/or data storage device enables requestors to submit data queries and receive response to the submitted data queries. For example, the data storage service 308 may include a database, such as an Structured Query Language (SQL) database, which enables the customer, the impairment detection service, or other services of the computing resource service provider 304 to query the data storage service 308 for information contained in or associated with the log data 346 and stored by the data storage service 308. In another example, the data storage service 308 may be non-queryable in so much as the data storage service 308 stores log data 346 (e.g., volume images) as data objects which are obtainable by a data object identifier, such as a file name or key, but does not enable queries on information contained in the data storage service 308.

The data storage service 308 may be a collection of computing resources configured to synchronously process requests to store and/or access data. The data storage service 308 may operate using computing resources (e.g., databases) that enable the data storage service 308 to locate and retrieve data quickly, to allow data to be provided in response to requests for the data. For example, the data storage service 308 may maintain stored data in a manner such that, when a request for a data object is retrieved, the data object can be provided (or streaming of the data object can be initiated) in a response to the request. As noted, data stored in the data storage service 308 may be organized into data objects. The data objects may have arbitrary sizes except, perhaps, for certain constraints on size. Thus, the data storage service 308 may store numerous data objects of varying sizes. The data storage service 308 may operate as a key value store that associates data objects with identifiers of the data objects that may be used by the customer to retrieve or perform other operations in connection with the data objects stored by the data storage service 308.

The impairment detection service 310 may be responsible for processing log data 346 obtained from the data storage service 302. For example, the impairment detection service 310 may obtain log data 346 from the data storage service 308 and may analyze log events included in the log data 346 to detect impairment of the virtual computer system instances 312. Information corresponding to this analysis may then be stored such that it is accessible to technicians, customers, or other services of the computing resource service provider 304 to be used to detect and mitigate impairments.

Figure 4:
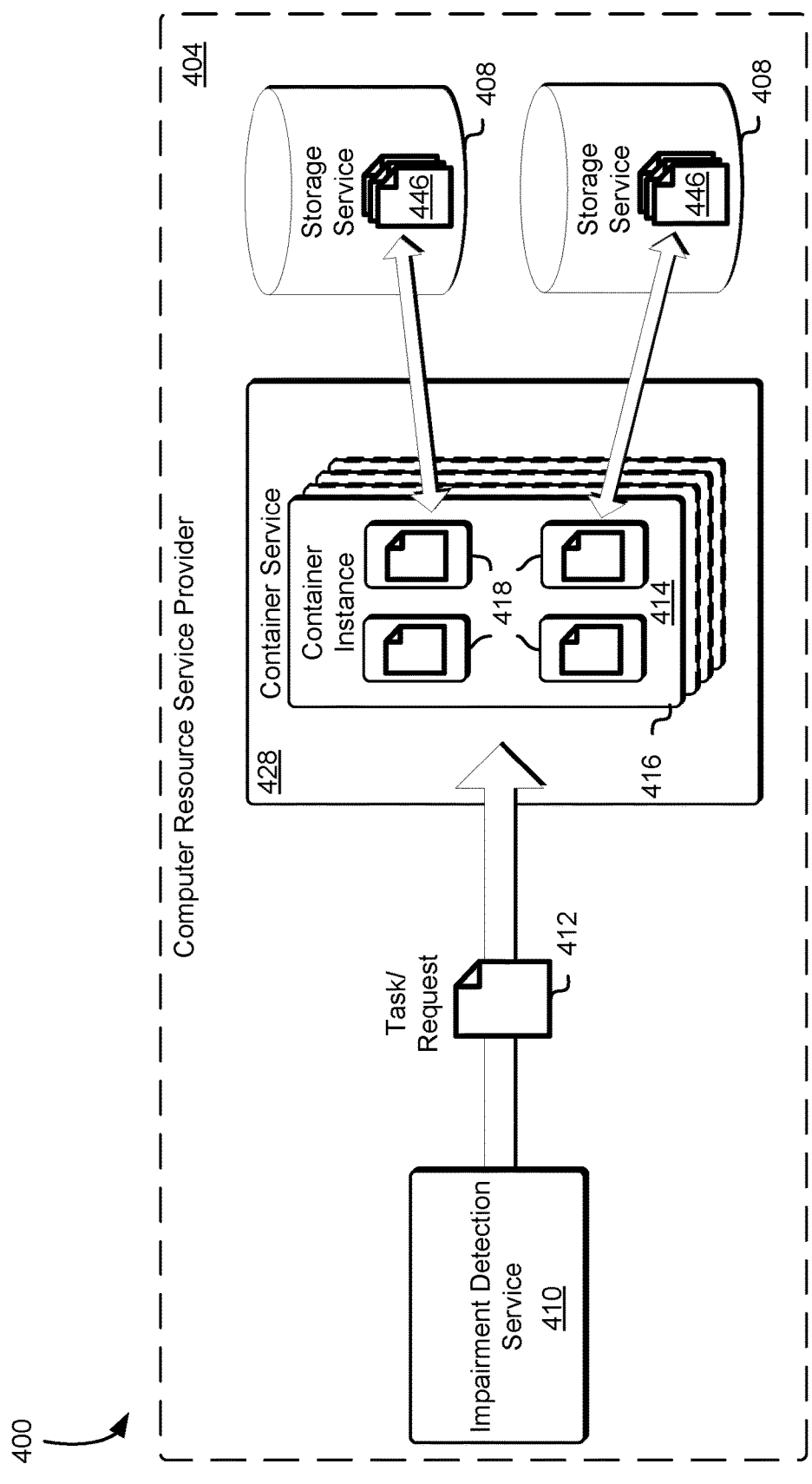
FIG. 4 is an environment illustrating the processing of log information by an impairment detection service in accordance with an embodiment.

FIG. 4 illustrates an aspect of an environment 400 in which an embodiment may be practiced. As illustrated in FIG. 4, the environment 400 may include an impairment detection service 410 that sends a task definition file 412 for software functions 418 along with a request to launch tasks through a network (not illustrated in FIG. 4 for simplicity) to a container service 428 of a computing resource service provider 404. A scheduler may determine into which container instance 414 of a cluster 416 of container instances that the software functions 418 specified in the task definition file 412 should be launched. In some embodiments, the software functions may be configured to share and/or access computing resources provided by other services of the computing resource service provider 404, such as log data 446 provided by an data storage service 408 of the computing resource service provider 404. In various embodiments, a notification that log data 446 has been stored by the data storage service 408 is transmitted directly to the container service 428. The notification may trigger the execution of the software function 418 without receiving an intervening task definition 412 and/or request from the impairment detection service 410.

The impairment detection service 410 may contain task definition 412 to perform various impairment detection operations such as pattern matching, data collection, data analysis, determining relevant factors, determining a cause of a particular impairment, and any other operation suitable for detecting and mitigating impairments to virtual computer system instances. In some embodiments, a single container instance 414 may be instantiated per operation of the impairment detection service 410. Alternatively, the computing resource service provider 404 may provide a fleet or cluster of container instances 414 to perform one or more operations of the impairment detection service 410. The cluster of container instances 414 may include multiple Internet Protocol (IP) addresses and a Network address translation (NAT) gateway configured to route traffic to the IP addresses. In this scenario, the impairment detection service 410 may be provided a particular IP address and traffic for the impairment detection service 410 is directed to the corresponding container instance 414 of the cluster 416 responsible for processing the request (e.g., a request to perform an operation of the impairment detection service 410), based at least in part on information provided by the NAT gateway. In various embodiments, the container service 428 or other services of the computing resource service provider 404 may contain the task and/or software function 418 to be executed by the container instance 414 on behalf of the impairment detection service 410. In such embodiments, the impairment detection service 410 may transmit a request to the computing resource service provider 404 to execute one or more tasks and/or software functions 418 indicated in the request.

Furthermore, the resources of the impairment detection service 410 may be made available to technicians, other users, and/or other services of the computing resource service provider 404. For example, the impairment detection service 410 may utilize the container instance 414 to provide a virtual presence for other users, and these other users may then interact with the impairment detection service 410 through the virtual presence through the container service 428. The virtual presence, for example, may include the webpage 200 described above in connection with FIG. 2. The webpage may enable technicians to obtain impairment data from the impairment detection service 410 or other service of the computing resource service provider hosting the impairment data on behalf of the impairment detection service such as the data storage service 408 or a data store service as described above. The impairment detection service 410 may communicate with the container service 428 of the computing resource service provider 404 through the network, which may be a communication network, such as the Internet, an intranet, an internet service provider (ISP) network and/or some other such network as described below.

In some examples, a "task definition" or "task definition file" may refer to a file specifying a set of linked containers (i.e., a set of containers that, when running on a host computing system, are associated with each other) that are assigned to start as a group. The task definition file 412 may further specify disk and network locations that the software functions 418 are able to share on a single physical machine. The task definition file 412 may then be utilized for launching the set of container instances 414. In some implementations, the task definition file 412 may define and link software functions 418 spread across multiple physical machines. One task definition file 412 may contain and schedule many tasks. In some examples, a "task" may refer to an instantiation of a task definition file 412, and may consist of one or more software functions 418. Tasks may be modified by applying a new task definition to the task.

The task definition file 412 may contain all the information needed to place software functions 418 in container instances 414 of a cluster 416, and the cluster 416 may be managed through application programming interface calls. An example task definition 412 specifies that one or more tasks with a given name have a software image located at a particular path. Furthermore, the task definition may allocate processing capacity, memory, IP address, port, and other computing resources to particular tasks of the one or more tasks. Similarly, the task definition 412 may also specify storage locations for data objects to be processed and data objects that may be created as a result of execution the software functions 418. In various embodiments, the task definition 412 indicates interaction between tasks and/or software functions 418. For example, a particular task definition 412 indicates that a first task obtains log data from the data storage service, a second task obtains additional data associated with a virtual computer system instance, and a third task process data from the first and second task to generate impairment data. Each task described above may have a software function 418 associated with the task and may be executed by the same or different container instances 414.

The container service 428 may be a service provided by the computing resource service provider 404 to allow the impairment detection service 410 to execute the software functions 418 within a single container 414 or a cluster 416. The computing resource service provider 404 may provide one or more computing resource services to its customers individually or as a combination of services of a distributed computer system. The one or more computing resource services of the computing resource service provider 404 may be accessible over a network and may include services such as virtual computer system services, block-level data storage services, cryptography services, data storage services, notification services, authentication services, policy management services, task services, notification services, data store services, data streaming services, and/or other such services. Not all embodiments described include all of the services described and additional services may be provided in addition to, or as an alternative to, services explicitly described.

The impairment detection service 410 supported by the container service 428 of the computing resource service provider 404 may communicate with one or more of the services, including the container service 428, via an interface, which may be a web services interface or any other type of customer interface. Each service provided by a computing resource service provider may have its own interface and subsets of the services may have corresponding individual interfaces in addition to, or as an alternative to, a common interface.

In some examples, a "container instance" may refer to a computer system instance (virtual or non-virtual, such as a physical computer system running an operating system) that is configured to launch and run software functions 418. Thus, the container instance 414 may be configured to run the software functions 418 within the container instance 414 in accordance with the task definition file 412 provided by the impairment detection service 410 or other entity, such as a software developer, technician, or other service of the computing resource service provider 404. One or more container instances 414 may comprise a cluster 416. In some examples, "cluster" may refer to a set of one or more container instances 414 that have been registered with the cluster. Thus, the container instance 414 may be one of many different container instances 414 registered with the cluster 416, and the other container instances of the cluster 416 may be configured to run the same or different types of software functions 418 as the container instance 414. The container instances 414 within the cluster 416 may be of different instance types or of the same instance type and the impairment detection service 410 may have access to or interact with more than one cluster 416. Thus, the impairment detection service 410 may launch one or more clusters 416 and then manage the software functions 418 within each cluster 416 through application programming interface calls.

A software function 418 may be a lightweight virtualization instance running under a computer system instance that allows processes and data used by the processes within the software function 418 to be isolated from other processes running in the same computer system instance or container instance 414. Thus, the software functions 418 may each be virtualization instances running under an operating system of the container instance 414 and executing in isolation from each other. Each of the software functions 418 may have their own namespace, and applications running within the software functions 418 are isolated by only having access to resources available within the container namespace. Thus, software functions 418 may be an effective way to run one or more single applications within their own namespace. A container encapsulation system allows one or more software functions 418 to run within a single operating instance without overhead associated with starting and maintaining virtual machines for running separate user space instances.

An example container encapsulation system is the Docker container engine. For example, an application may consist of several software functions 418, these software functions 418 may be configured to perform operations on behalf of the impairment detection service 410 or other service of the computing resource service provider 404. The software functions 418 are executed in a container instance 414, as described above, using computing resources of a computing resource service provider 404 and thereby reducing or eliminating load on the impairment detection service 410. Software developers, technicians, and others associated with the impairment detection service 410 may develop applications and software functions 418 to perform various operations of the impairment detection service 410 using computing resources of the computing resource service provider 404.

The software functions 418 may be launched to have only specified resources from resources allocated to the container instance 414; that is, a software function 418 may be launched to have a certain amount of memory and to not utilize more than a specified amount of processing power. The resource allocation for the software functions 418 may be specified in the task definition file 412 as described above. Multiple software functions 418 may be running simultaneously on a single host computer or host container instance, and the resources of the host can be allocated efficiently between the software functions 418, container instances 414, and/or clusters 416 of container instances 414. In some embodiments, a host may support running software functions 418 in container instances 414 from only the impairment detection service 410. In other embodiments, a single host may allow multiple services of the computing resource service provider 404 to have container instances 414 running on the host. In the latter case, the container service 428 may provide security to ensure that the services of the computing resource service provider 404 are unable to access containers, clusters, or container instances of the others.

Different types of tasks may have different resource requirements and may have different lifespans. Thus, the software functions 418 may be dynamically scheduled to run by a scheduler service in the container service 428 independent of an underlying operating system of the container instance 414, and as such, the underlying operating system of the container instance 414 may be very basic. Alternatively, the containers 414 may be scheduled to run by a scheduler installed within the container instance 414 of the cluster 416. The other services may be services such as services described above of the computing resource service provider. Likewise, the other resources may include resources that can be shared between virtualized instances, such as storage computing resources of a block-level data storage service or the data storage service 408.

As noted, a container encapsulation system provided by or interfaced to the container service 428 may allow a customer, technician, or software developer to configure one or more applications within a software function 418 of an operating system that supports containers. The base container and the applications and data within it may then be packaged as an image. In some examples, an "image" may refer to an entire copy of a particular state of the base container at the time the image was generated. The image thereafter may be used to launch one or more identical software functions, each of which may be assigned the specified amount of resources and may be isolated from each other. The software functions may be launched on the same or different physical machines and each software function may be expected to run in exactly the same way as the base container.

Figure 5:
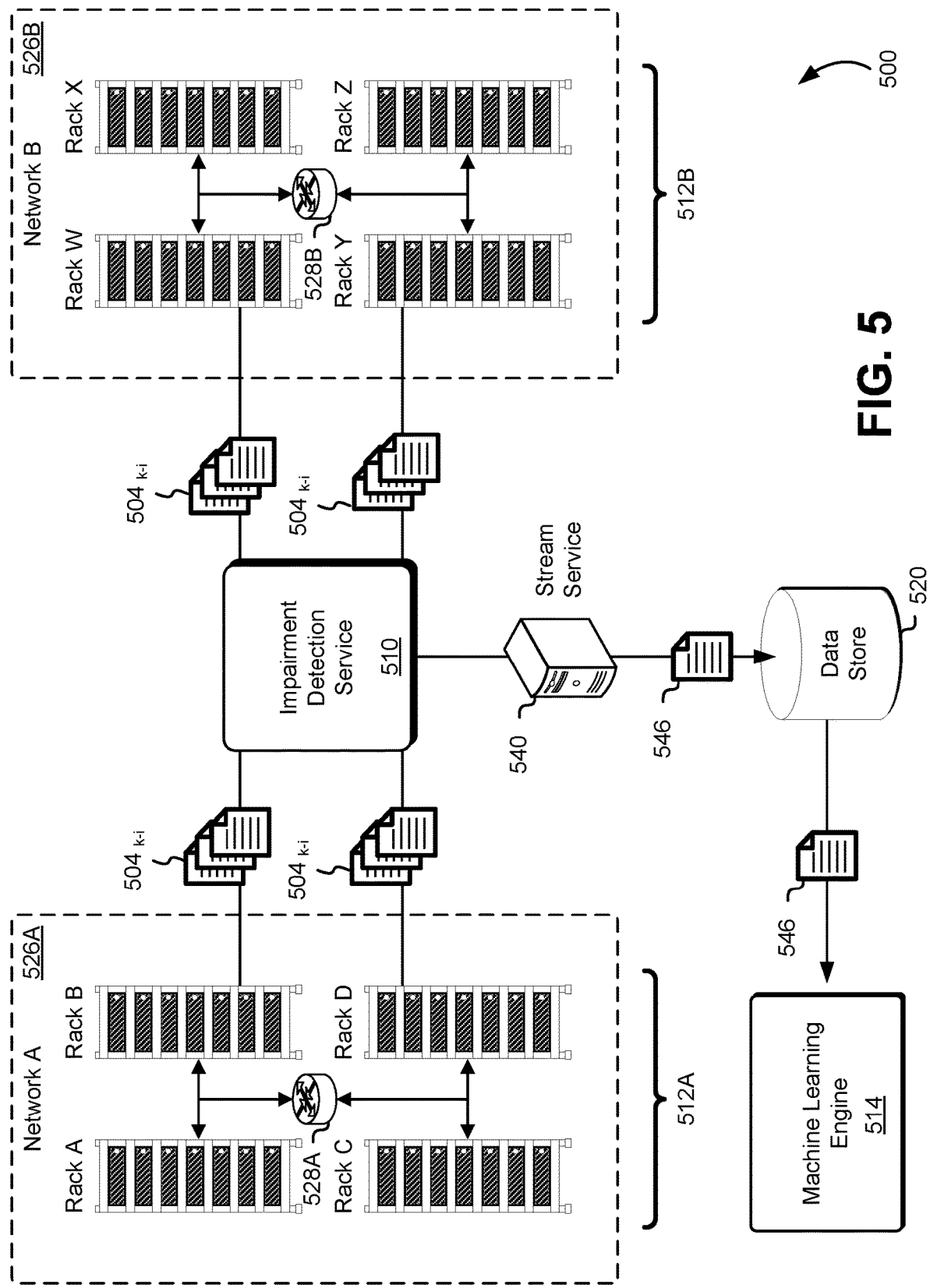
FIG. 5 is an environment illustrating the processing of log information by a machine learning engine in accordance with an embodiment.

FIG. 5 illustrates an aspect of an environment 500 in which an embodiment may be practiced. Specifically, FIG. 5 depicts the collection and processing of logs 504 generated by computing resources (e.g., virtual computer system instances) provided by a computing resource service provider to customers. The environment 500 may include a stream service 540 that receives impairment data from an impairment detection service as described above. As illustrated in FIG. 5 the impairment detection service may obtain one or more logs 504 from computing resources executed by servers in the sets of racks 512A-512B. The one or more logs 504 may be processed to generate impairment data 546 which is then passed to the stream service 540. In various alternative embodiments, the logs 504 are provided directly to the stream service 540 and impairment data 546 may then be obtain by processing data streams published by the stream service described in greater detail below.

The computing resources described above may be placed on the servers according to a rack diversity constraint, where the sets of racks 512 may be localized by different networks 526A-526B. The logs 504 may include various logs $504_{k-i}$ obtained from different computing resources executed by the servers in the sets of racks 512A-512B. The stream service 540 may be a computing system of one or more computing systems configured to obtain logs $504_{k-i}$ and/or impairment data 546 generated by computing resources of computing resource service provider as described above in conjunction with FIGS. 3 and 4. Furthermore, the stream service 540 may include computer systems configured to process the logs 504 and impairment data 546 which may be consumed by the impairment detection service 510 or a machine learning engine 514, for example, as a stream of data. The stream service 540 may include a data store 530 or may provide the impairment data 546 to the data store 520 for additional processing and analysis.

The data store 520 may include a set of computing resources, such as the servers in the sets of racks 512A-512B, used for reporting and data analysis. In one example, the data store 520 includes a central repository of impairment data 546 from one or more disparate sources such as the computing resources illustrated in FIG. 5. The data store 520 stores current and historical impairment data 546 and may be used for creating analytical reports for technicians as described above in connection with FIG. 2. For examples, these reports include comparison, correlations, and causation of impairments over various intervals of time across various computer systems. As illustrated in FIG. 5, the logs 504 and other data provided to the data store 520 may pass through other computer systems and services before arriving at the data store 520. This may enable processing of the data and determination and/or collection of additional data.

In various embodiments, the data store 520 may also include a data mart, a dependent data mart, an independent data mart, a hybrid data mart, an online analytical processing (OLAP) component, an online transaction processing (OLTP) component, and a predictive analysis component. In addition, the data store 520 may also include one or more software tools to analyze the data included in the data store 520. The software tools may be executed by a variety of different computing resources as described herein such as the containers, virtual computer system instances, virtual hardware, or physical hardware (e.g., servers). The data store 520 may utilize various processes or steps to perform the storage and analysis operations described herein. These may include staging, data integration, and access layers. The staging layer or staging database stores raw data extracted from each of the disparate source data systems such as the virtualization layers, virtual computer system instance, and impairment detection service 510. The integration layer integrates the disparate data sets by transforming the data from the staging layer often storing this transformed data in an operational data store database. The integrated data may then be arranged and/or aggregated based at least in part on a data base schema or other organizational information.

Returning to FIG. 5, the sets of racks 512A-512B may be physical hardware configured to host one or more servers, or, in some embodiments, may simply be logical groupings of the one or more servers. Examples of logical groupings other than by rack may include servers grouped together based on data center location, servers in different fault isolation groups (i.e., logical divisions of resources such that failure of one fault zone may not affect servers in the other zones; e.g., grouped by geographic regions, data centers, hard drive clusters, backup generators, etc.), servers grouped together based on performance characteristics (e.g., throughput, input/output operations per second, etc.), and so on. The servers in a rack may be members of a particular network. In some implementations, multiple racks of servers may be members of the same network. For example, as illustrated in FIG. 5, the servers of the set of racks 512A share the network 526A. Likewise, the servers of the set of racks 512B share the network 526B. Additionally, the set of racks 512A and 512B may be a "brick server" or other server that is a compact computer server module without a chassis that may include various processors, RAM, I/O, and storage configurations and may be designed to fit into various rack locations. The set of racks 512A and 512B may also be connected by a top of rack switch.

The networks 526A-526B may be data communication pathways between one or more electronic devices. The networks 526A-526B may be wired or wireless networks and may use any of a variety of communications protocols for organizing their network traffic. The networks 526A-526B may allow the sharing of files, data, and other types of information between the one or more electronic devices accessible through the data communication pathways. Each of the networks 526A-526B may be associated with a router, such as an aggregation router that aggregates the servers of the respective set of racks into the common network, separate from the router associated with the other network. Each of the networks 526A-526B may be on a different subnet than the other network. For example, as illustrated in FIG. 5, the servers of the set of racks 512A may be commonly connected to a router 528A. Similarly, the servers of the set of racks 512B may be commonly connected to a router 528B. The routers 528A-528B may be networking devices that forward packets between computer networks, such as between the networks 526A-526B.

The stream service 540 may also include a data store or data storage system that stores the impairment data 546 and/or logs $504_{k-i}$ such that the logs may be queried. In this manner, the impairment detection service 510 may be able to query the impairment data 546 and/or logs $504_{k-i}$ for information as well as being provided information corresponding to the impairment data 546 and/or logs $504_{k-i}$ through a data stream. In various embodiments, the data stream includes the impairment data 546 and/or logs $504_{k-i}$. The impairment detection service 510 may be a computer system managed by a user and/or customer, for example, a customer of a computing resource service provider. Additionally, the impairment detection service 510 may be another service or computer system of the computing resource service provider. For example, impairment detection service 510 may be provided access to the logs $504_{k-i}$ by a customer. This may cause the stream service to provide impairment data 546 to the impairment detection service 510 for analysis and monitoring. The impairment data 546 may contain all of the updates to a log-structure storage device implemented by the server computer systems.

The machine learning engine 514 may include a set of computing resources such as the virtual computing resources or physical computing resources described herein. In addition, the machine learning engine 514 may be part of the impairment detection service 510. Impairment data 546 may be obtained by the machine learning engine 514 and used to determine a cause for a particular impairment or set of impairments. The machine learning engine 514 may execute a variety of different algorithms on the impairment data 546 or other data sets in order to determine a cause for a particular impairment. The algorithms may be classified as supervised learning algorithms, unsupervised learning algorithms, or reinforcement learning algorithms. The machine learning engine 514 may output a classification of the impairment data 546 or a clustering of the impairment data 546 in order to provide a cause of the impairment. The cause of the impairment may include relevant factors as described above. For example, the cause may be a particular version of an application executed by a virtual computer system instance. Any number or combination of a number of machine learning algorithms may be used in accordance with the present disclosure such as decision tree learning, neural networks, deep learning, inductive logic, support vector machines, clustering, similarity learning, metric learning, or any other machine learning or computation statistical algorithm.

The machine learning engine 514 may continuously process the impairment data 546 or may process the impairment data 546 at particular intervals of time. Furthermore, the machine learning engine 514 may provide a cause of the impairment to a technician or other human operator of the impairment detection service 510, such as through the user interface of the webpage described above in connection with FIG. 2. Furthermore, the technician or other human operator of the impairment detection service 510 may provide feedback to the machine learning engine. The machine learning engine 514 may also determine a solution for the cause of the impairment or notify other services of the computing resource service provider of the cause of the impairment. Returning to the example above, once the machine learning engine 514 has determined that the particular version of the application executed by the virtual computer system instance is the cause of the impairment, the machine learning engine or other component of the impairment detection service may transmit a notification indicating a cause of the impairment.

In various embodiments, the notification is transmitted to an automatic impairment correction service responsible for correcting the impairment without intervening actions performed by the customer. For example, the automatic impairment correction service may revert the application responsible for the impairment to a previous version or update the application to a new version known to correct the impairment. The notification may also be transmitted to customers associated with the virtual computer system instances. Any combination of impairment correction and notification may be practiced in accordance with the present disclosure. For example, the machine learning engine 514 or other component such as the automatic impairment correction service may determine if the impairment may be corrected without involvement of the customer and, if so, correct the impairment without notifying the customer. Specifically, if the impairment is a result of the BIOS patch level of a particular server hosting the virtual computing system instance, the automatic impairment correction service may simply update the BIOS patch level without notifying the customer. Alternately, if the machine learning engine 514 or other component such as the automatic impairment correction service determines that correction of the impairment requires operations to be performed by the customer, then a notification of the cause of the impairment (including instructions to correct the impairment) may be transmitted to the customer. For example, if the impairment is caused by a library file of an operating system of the customer's virtual computing system instance, the notification may include a reference to the library file and instructions to update and/or replace the library file.

Figure 6:
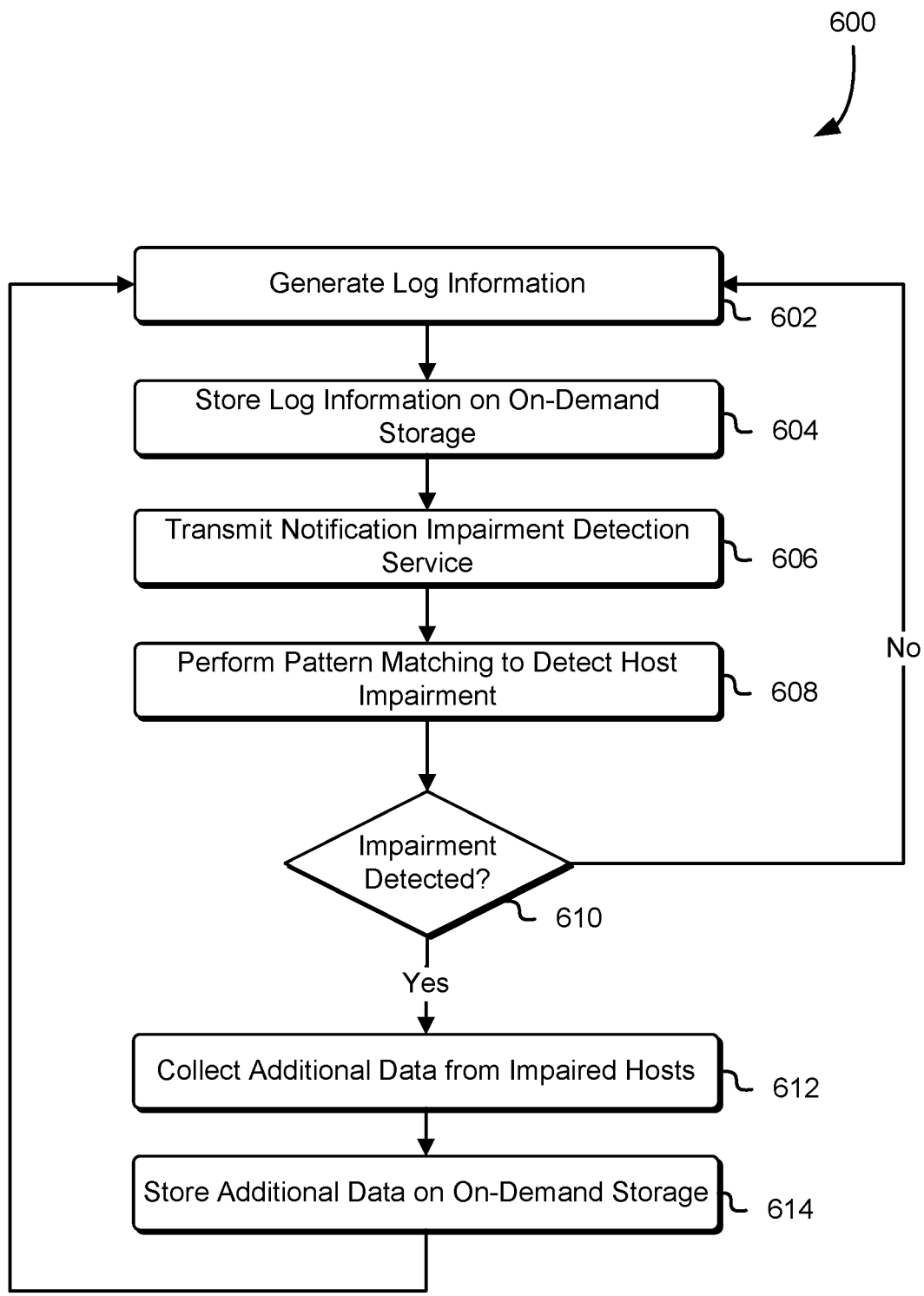
FIG. 6 illustrates an example process for collecting log information by an impairment detection service in accordance with an embodiment.

FIG. 6 shows an illustrative process 600 which may be used to detect impairment of a virtual computer system instance in accordance with at least one embodiment. The process 600 may be performed by any suitable system such as the impairment detection system described above in FIG. 1 or any combination of systems or component thereof such as the container instances. Returning to FIG. 6, in an embodiment, the process 600 includes generating log information 602. The log information may be generated by a virtualization layer or component thereof such as a virtual computer system management component. The log information may be generated based at least in part on operations or events of the virtual computer system instances supported by the virtualization layer. For example, the log information may include executable code executed by the virtual computer system instance. In another example, the log information may include events such as shut downs, reboots, crashes, hang-ups, and/or forced restarts of the virtual computer system instances.

The system executing the process 600 may then store the log information with data storage service 604. For example, the virtualization layer may transmit an API request, as described above, to store the log information as a data object using storage computing resources of the data storage service. The virtualization layer may store the log information for an interval of time and provide all of the log information collected and/or generated during the interval of time to the data storage service. The data storage service or other system executing the process 600 may then transmit a notification to the impairment detection service 606. The notification may be trigger by an event registered by a notification service as described above. The notification may include information identifying the log information stored by the data storage service. Furthermore, the notification may trigger one or more other events, such as performing pattern matching to detect host impairment 608.

A container instance or cluster of container instances may perform the pattern matching to detect impairment of virtual computer system instances as described above. The container instances may execute a software function that performs regular expression matching to search the log information for indications of impairment and associated virtual computer system instances. For example, the software function, when executed by the container, may cause the container to parse the log information for a string indicating that the virtual computer system instance was not properly shut down. The software function may also cause the container to obtain identifying information for the virtual computer system instance so that additional information associated with the virtual computer system instance may be obtained. Other computer resources as described herein may be used to perform the regular expression and string matching functions described above.

The system executing the process 600 may then determine based at least in part on the result of the pattern matching whether an impairment to a virtual computer system instance is detected 610. If no impairment is detected the system performing the process 600 may not perform any additional processing. The system executing the process 600 may continue to generate log information, store the log information, and transmit notification during performance of pattern matching and additional processing described below. For example, while a container is performing pattern matching, the virtualization layer may continue to monitor execution and operation of the virtual computer system instances. These operations may be performed by the same computer system or different computer systems.

Returning to FIG. 6, once an impairment is detected, the system executing the process 600 may collect additional data from the impaired hosts 612. For example, a container instance may request information associated with the virtual computer system instance from one or more services of a computing resource service provider. The information may include any information described herein such as customer information, server information, network information, software information, operating system information, version information, operational information, or virtual computer system instance information. The information may be collected and processed according to a storage schema or other data structure. Once the additional information is obtained, the system executing the process 600 may then store the additional data with data storage service 614. The additional data may be stored with the log information or associated with the log information. The additional data may also be stored as the log information described above. In numerous variations of the process 600, the additional data and log information may be provided to a data store and/or stream service as described above. In addition the additional data and log information may be further processed to generate impairment data as described above.

Figure 7:
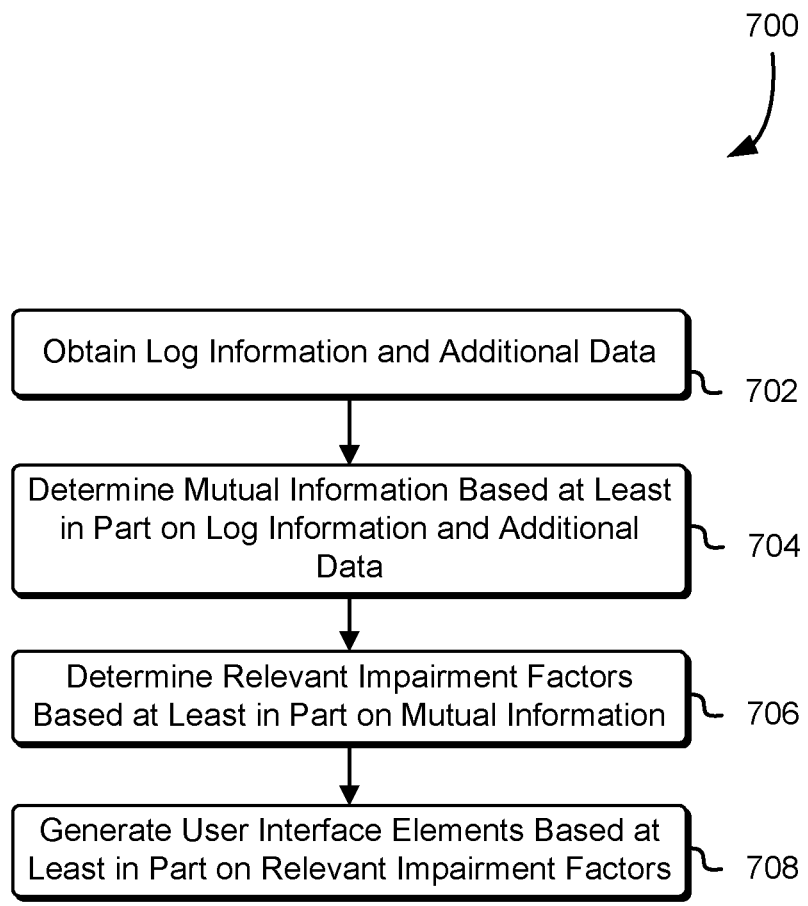
FIG. 7 illustrates an example process for determining relevant impairment factors by an impairment detection service in accordance with an embodiment.

FIG. 7 shows an illustrative process 700 which may be used to determine one or more relevant factors of an impairment of a virtual computer system instance in accordance with at least one embodiment. The process 700 may be performed by any suitable system such as the impairment detection system described above in FIG. 1 or any combination of systems or components thereof such as the container instances. Returning to FIG. 7, in an embodiment, the process 700 includes obtaining log information and additional data 702. The log information and additional data may be obtained from a data store as described above. The log information and additional data may also be streamed to the system executing the process 700.

The system executing the process 700 may then determine mutual information based at least in part on the log information and additional data 704. The mutual information may be used to correlate information obtained the logs and/or additional information. The mutual information of two variables may be a measure of the dependence between the two variables. Specifically, the mutual information may provide a value for an amount of information (e.g., bits) obtained about one variable, through the other variable. The mutual information measured between the variables is linked to that of entropy of a random variable, which may define the amount of information held in a random variable. The mutual information may not be limited to real-valued random variables like the correlation coefficient. The mutual information may be generalized to determine how similar the joint distribution p (x, y) is to the products of factored marginal distribution p(x) and p(y). For example, the mutual information is the expected value of the pointwise mutual information. The mutual information may be measured in bits.

This measures (e.g., the mutual information in bits) the information that x and y share. For example, the mutual information measures how much knowing one of these variables reduces uncertainty about the other (e.g., a relevance or correlation of one variable to the other). For example, if x and y are independent, then knowing x does not give any information about y and vice versa, so their mutual information is zero. At the other extreme, if x is a deterministic function of y and y is a deterministic function of x then all information conveyed by x is shared with y and the mutual information would be 1. This indicates that knowing x determines the value of y and vice versa. As a result, in this case the mutual information is the same as the uncertainty contained in y (or x) alone, namely the entropy of y (or x). Moreover, this mutual information is the same as the entropy of x and as the entropy of y. This information may be used to determine one or more relevant factors of a particular impairment.

Mutual information is therefore, a measure of the inherent dependence expressed in the joint distribution of x and y relative to the joint distribution of x and y under the assumption of independence. Mutual information therefore measures dependence in the following sense: I(X; Y)=0 if and only if x and y are independent random variables. Therefore, if x and y are independent, then p(x, y)=p(x)p(y), the result of the equation is 0. Moreover, mutual information is nonnegative (e.g., I(X; Y)≥0; see below) and symmetric (e.g., I(X; Y)=I(X; Y)).

Formally, the mutual information of two discrete random variables X and Y can be defined as:

$$I(X;Y) = \sum_{y \in Y}\sum_{x \in X} p(x,y)\log\left(\frac{p(x,y)}{p(x)p(y)}\right)$$

where p(x, y) is the joint probability distribution function of X and Y, and p(x) and p(y) are the marginal probability distribution functions of X and Y respectively. In addition a metric may be calculated based at least in part on the mutual information. In an embodiment, the container instances calculate this metric, e.g., a distance measure between a pair of points, utilizing the mutual information to determine a relevance for a particular factor. For example, the quantity $$d(x,y)=H(X,Y)-I(X;Y)=h(X)+H(Y)-2I(X;Y)=H(X|Y)+H(Y|X)$$

satisfies the properties of a metric (e.g., triangle inequality, non-negativity, indiscernibility, and symmetry) and may be used by the container instances to determine the metric. The container instances may also provide the metric to the impairment detection service, the impairment detection service may then determine the one or more relevant factors based at least in part on the metric. Other methods for determining and/or calculating mutual information and/or a metric thereof may be used in accordance with the present disclosure such as conditional mutual information, multivariate mutual information, normalized variants, weighted variants, adjusted mutual information, absolute mutual information, mutual information and linear correlation, mutual information for discrete data, or any other method for determining mutual information.

Returning to FIG. 7, the system executing the process 700 may then determine relevant impairment factors based at least in part on the mutual information described above 706. The relevant information may include one or more variables with the highest score or largest metric value calculated, for example, using the formulas described above. The system executing the process 700 may then generate user interface elements based at least in part on the relevant impairment factors 708. For example, the user interface element includes a list of relevant factors as illustrated in FIG. 2.

Figure 8:
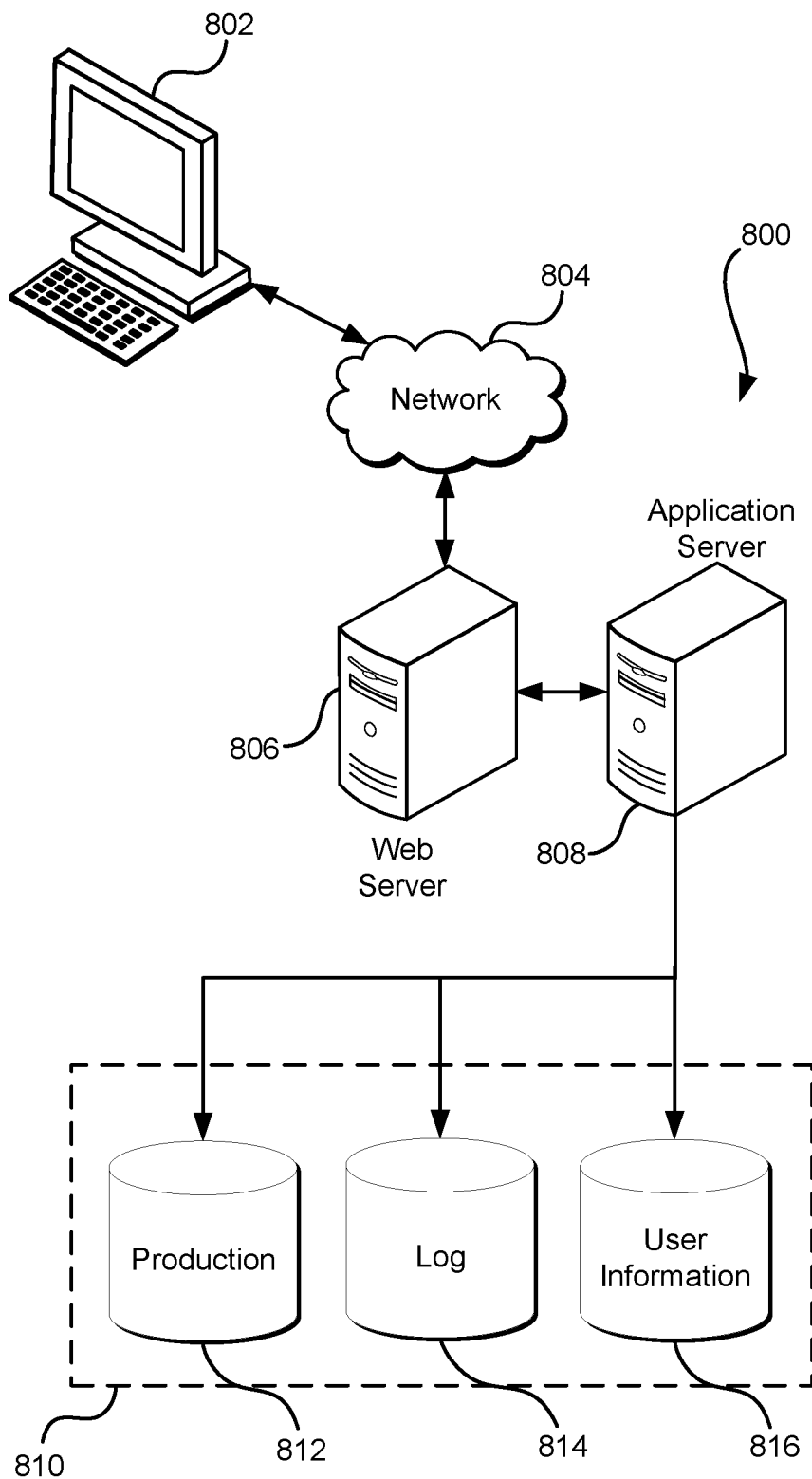
FIG. 8 illustrates an environment in which various embodiments can be implemented.

FIG. 8 illustrates aspects of an example environment 800 for implementing aspects in accordance with various embodiments. As will be appreciated, although a web-based environment is used for purposes of explanation, different environments may be used, as appropriate, to implement various embodiments. The environment includes an electronic client device 802, which can include any appropriate device operable to send and/or receive requests, messages, or information over an appropriate network 804 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network or any other such network and/or combination thereof. Components used for such a system can depend at least in part upon the type of network and/or environment selected. Many protocols and components for communicating via such a network are well known and will not be discussed herein in detail. Communication over the network can be enabled by wired or wireless connections and combinations thereof. In this example, the network includes the Internet and/or other publicly addressable communications network, as the environment includes a web server 806 for receiving requests and serving content in response thereto, although for other networks an alternative device serving a similar purpose could be used as would be apparent to one of ordinary skill in the art.

The illustrative environment includes at least one application server 808 and a data store 810. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices, and data storage media, in any standard, distributed, virtual, or clustered environment. The application server can include any appropriate hardware, software, and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video, and/or other content usable to be provided to the user, which may be served to the user by the web server in the form of HyperText Markup Language ("HTML"), Extensible Markup Language ("XML"), JavaScript, Cascading Style Sheets ("CSS"), JavaScript Object Notation (JSON), and/or another appropriate client-side structured language. Content transferred to a client device may be processed by the client device to provide the content in one or more forms including, but not limited to, forms that are perceptible to the user audibly, visually, and/or through other senses. The handling of all requests and responses, as well as the delivery of content between the client device 802 and the application server 808, can be handled by the web server using PHP: Hypertext Preprocessor ("PHP"), Python, Ruby, Perl, Java, HTML, XML, JSON, and/or another appropriate server-side structured language in this example. Further, operations described herein as being performed by a single device may, unless otherwise clear from context, be performed collectively by multiple devices, which may form a distributed and/or virtual system.

The data store 810 can include several separate data tables, databases, data documents, dynamic data storage schemes, and/or other data storage mechanisms and media for storing data relating to a particular aspect of the present disclosure. For example, the data store illustrated may include mechanisms for storing production data 812 and user information 816, which can be used to serve content for the production side. The data store also is shown to include a mechanism for storing log data 814, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. The application server 808 may provide static, dynamic, or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 802. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed (i.e., as a result of being executed) by a processor of the server, allow the server to perform its intended functions.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of computers, such as desktop, laptop, or tablet computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and other devices capable of communicating via a network. These devices also can include virtual devices such as virtual machines, hypervisors, and other virtual devices capable of communicating via a network.

Various embodiments of the present disclosure utilize at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C#, or C++, or any scripting language, such as Ruby, PHP, Perl, Python or TCL, as well as combinations thereof. The server(s) may also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen, or keypad) and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. In addition, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. In some embodiments, the code is stored on set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code.

Accordingly, in some examples, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described herein and such that a single device may not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method performed by an impairment detection service, comprising:
    obtaining a notification of an event associated with a computing instance provided to customers of a computing resource service provider;
    as a result of obtaining the notification of the event, obtaining, from a log of operations performed by the computing instance, log information indicating at least other events associated with the computing instance;
    performing pattern matching against the log information to produce a pattern matching result that indicates the computing instance is impaired; and
    as a result of determining, based at least in part on the pattern matching result, that the computing instance is impaired, requesting additional data about the computing instance from a service of the computing resource service provider based at least in part on an identification of a customer of the computing resource service provider associated with the computing instance, and performing a mitigation operation against the computing instance to mitigate impairment of the computing instance based at least in part on the additional data.

2. The computer-implemented method of claim 1, further comprising:
    obtaining the additional data from one or more services of the computing resource service provider that are external with respect to the impairment detection service; and
    determining the mitigation operation based at least in part on the pattern matching result and the additional data.

3. The computer-implemented method of claim 1, wherein:
    the computer-implemented method further comprises determining a correlation value indicating a measure of dependence between a data value from the log information and a data value from the additional data; and
    determining the mitigation operation further includes determining the mitigation operation based at least in part on the correlation value.

4. The computer-implemented method of claim 1, further comprising:
    generating impairment data based at least in part on the log information;
    determining a cause of the impairment of the computing instance by providing the impairment data to a machine learning algorithm; and
    determining the mitigation operation based at least in part on the cause of the impairment.

5. The computer-implemented method of claim 4, further comprising generating a user interface that includes a graphical user interface element that displays a factor relating to the impairment determined based at least in part on the impairment data.

6. The computer-implemented method of claim 1, wherein performing the mitigation operation includes reverting an application responsible for the impairment to a previous version.

7. The computer-implemented method of claim 6, wherein performing the mitigation operation includes automatically performing the mitigation operation as a result of determining that the impairment can be corrected without involvement of a customer associated with the computing instance.

8. The computer-implemented method of claim 1, wherein:
    the request includes information indicative of a particular customer of the computing resource service provider; and the impairment detection service is external with respect to a computing device on which the computing instance is executing.

9. The computer-implemented method of claim 1, wherein:
    the request is from the impairment detection service to a virtualization layer that corresponds to the computing instance; and
    the request includes an application programming interface (API) request.

10. A system, comprising:
    one or more processors; and
    memory that includes executable instructions that, when executed by the one or more processors, cause the system to:
        as a result of detection of an occurrence of an event associated with a virtual machine instance provided to customers of a computing resource service provider, obtain, from an operation log of the virtual machine instance, log information indicating at least other events associated with the virtual machine instance;
        produce a pattern matching result at least by causing the system to perform pattern matching against the log information;
        as a result of the pattern matching result indicating that the virtual machine instance is impaired, request additional data from a service of the computing resource service provider based at least in part on an identification of a customer of the computing service provider that is associated with the virtual machine instance; and
        mitigate impairment of the virtual machine instance at least in part by causing the system to perform a mitigation operation against the virtual machine instance based at least in part on the additional data.

11. The system of claim 10, wherein the executable instructions that cause the system to perform the mitigation operation further include instructions that further cause the system to update an application responsible for the impairment to a new version.

12. The system of claim 10, wherein the executable instructions further include instructions that further cause the system to provide a user interface that includes a plurality of graphical user elements available for selection, the plurality of graphical user elements representing possible causes of the impairment.

13. The system of claim 12, wherein the executable instructions further include instructions that further cause the system to:
    obtain, via the user interface, a selection of a graphical user element from the plurality of graphical user elements; and perform the mitigation operation as a result of obtaining the selection.

14. The system of claim 12, wherein:
the plurality of graphical user elements includes an additional graphical user interface usable to select a particular interval; and
the executable instructions further include instructions that further cause the system to:
    obtain a selection of the additional graphical user interface; and
    filter impairment information displayed via the user interface according to the particular interval corresponding to the selection.

15. The system of claim 10, wherein:
the executable instructions further include instructions that further cause the system to, further as the result of the pattern matching result including indications of impairment:
    determine a correlation between the log information and the additional data; and
wherein the additional data includes information about computer resources associated with the virtual machine instance.

16. The system of claim 15, wherein the executable instructions further include instructions that further cause the system to:
    identify, based at least in part on the correlation, a factor in the impairment; and
    determine the mitigation operation based at least in part on the factor.

17. The system of claim 16, wherein the executable instructions further comprise instructions that further cause the system to generate a graphical user interface element based at least in part on the factor.

18. One or more non-transitory computer-readable storage media storing executable instructions that, as a result of being executed by one or more processors of a computer system, cause the computer system to:
    in response to a detected occurrence of an event associated with a virtual machine instance, obtain log information, indicating at least other events, corresponding to operation of the virtual machine instance;
    perform pattern matching against the log information to obtain a pattern matching result;
    as a result of a determination of an operational impairment of the virtual machine instance based at least in part on the pattern matching result indicating at least impairment of the virtual machine instance, cause a request for additional data about the virtual machine instance to be submitted to a service of a computing resource service provider of the virtual machine instance based at least in part on an identity of a customer of the computing resource service provider that is associated with the virtual machine instance; and
    mitigate the operational impairment by causing the computer system to perform a mitigation operation against the virtual machine instance based at least in part on the additional data.

19. The one or more non-transitory computer-readable storage media of claim 18, wherein the executable instructions further include instructions that further cause the computer system to notify a customer associated with the virtual machine instance of the operational impairment.

20. The one or more non-transitory computer-readable storage media of claim 18, wherein the executable instructions further include instructions that further cause the computer system to provide feedback based on the operational impairment to a machine learning engine.

21. The one or more non-transitory computer-readable storage media of claim 18, wherein the executable instructions further include instructions that further cause the computer system to:
    obtain the additional data about the virtual machine instance;
    determine, based at least in part on the log information and the additional data, a factor relevant to the operational impairment; and
    determine the mitigation operation based at least in part on the factor.

22. The one or more non-transitory computer-readable storage media of claim 21, wherein the additional data includes at least one of:
    an identity of a customer associated with the virtual machine instance,
    hardware configuration of a physical host that hosts the virtual machine instance, or
    a software version of software executed by the virtual machine instance.

\* \* \* \* \*